March 13, 1956  G. O. CONNER  2,737,670
TAPPING TOOL
Filed March 12, 1951

INVENTOR.
GUY O. CONNER
BY

United States Patent Office 2,737,670
Patented Mar. 13, 1956

2,737,670

TAPPING TOOL

Guy O. Conner, Cleveland Heights, Ohio, assignor to Republic Steel Corporation, Cleveland, Ohio, a corporation of New Jersey Application March 12, 1951, Serial No. 215,132

3 Claims. (Cl. 10—141)

This invention pertains to thread cutting tools, and more particularly to a tap for the internal threading of a hole and the method of forming the tap.

In the past, internal threads have been formed in holes by a tool called a tap. This tool was adapted for either power driven machines or hand driving, but in either case, cutting speeds were necessarily relatively slow. This slow speed was necessary to avoid breaking either the tool or the cutting edges thereof by the jamming of chips between the teeth. Chips coming from both edges of the V-shaped cutting edges converged toward the center of the V and there met. If these chips came off too fast and many times even at slow speeds, the chips jammed between threads and either mutilated the newly cut threads or broke the cutting edges. At higher speeds, it was common to break taps because of this jamming.

Further difficulty was experienced in prior taps in getting closer than a class 1 or 2 fit and in getting a smooth finish on the thread. Here again the trouble lies primarily in the cutting of the thread from both sides at once. In lathe-cut threads where the thread is cut from one face only, no such difficulty exists.

By my invention, it is possible to cut an internal thread having a smooth surface for ease of screwing in the screw or bolt and having a close fit with comparatively full threads for accuracy and strength. This accuracy and strength can be achieved, not only on nuts but on other tapped holes as well. The only requirement is that the driving tool have a positive feed. One such machine particularly adapted for tapping nuts is shown in my co-pending application, Ser. No. 215,131 filed March 12, 1951. My invention is not limited to use with that machine, however, as will be apparent to those skilled in the art, but could be used with any machine tool having a positive feed.

A more complete understanding of my invention may be gained from the following description and the drawings which form a part of this specification.

Briefly, my invention comprises a tap constructed so as to cut on only one side of a thread. One preferred method of forming the tool is also disclosed.

Figure 1:
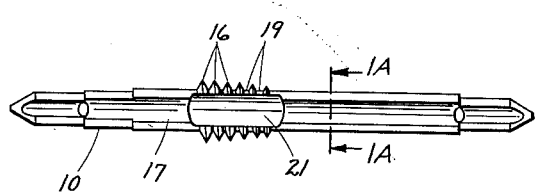
Fig. 1 is a view of the tool adapted for use in the driving machine.
Figure 1A:
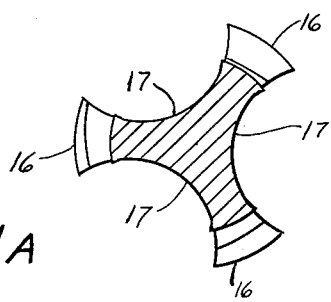
Fig. 1a is a section on the line 1a—1a of Fig. 1.

More particularly, and referring to the drawings, my invention comprises a tapping tool 10 adapted to be held in a chuck or a spindle driven by a driving machine. The chuck or spindle must be adapted to feed the tool into the workpiece or blank at the proper lead to cut threads of the proper pitch. The need for this will be made apparent hereinafter. As illustrated in Fig. 1, the tool 10 is formed with a shank 11 at each end thereby being adapted to be driven from both ends. This is desirable, as explained in my aforesaid co-pending application, but is not essential to the usefulness of the novel formation of the cutting edges.

Figure 4:
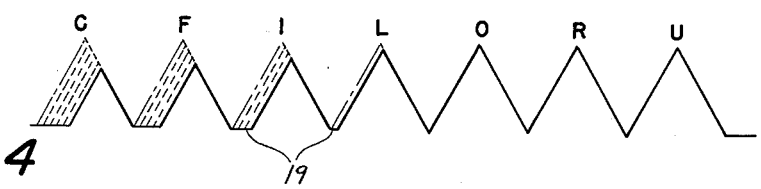
Fig. 4 is a view similar to Fig. 2 showing the edges of a third set of teeth.
Figure 3:
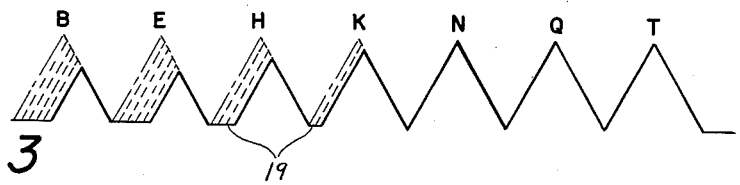
Fig. 3 is a vew similar to Fig. 2 showing the edges of a second set of teeth.
Figure 2:
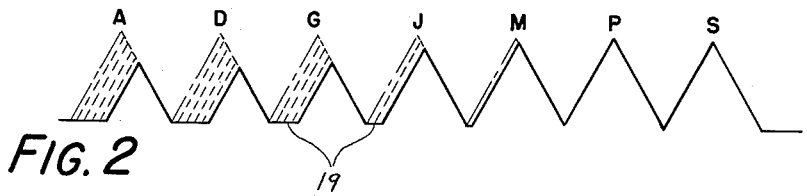
Fig. 2 is a diagrammatic view showing the edges of a first set of teeth to a greatly enlarged scale.

The tool 10 is formed in a unique manner illustrated in Figs. 2–4. In these figures, the edges of the cutting teeth 16 on a tap having three flutes 17 are shown. The teeth are designated by letters A–U inclusive in the order in which they cut into the metal. When the tool is first formed and after the flutes are formed, the teeth 16 are all made as full teeth as shown by the dot-dashed lines. Then by my invention an appropriate number of teeth are ground off on one side only. The amount of metal to be taken off in this grinding will vary with the size of tap and the finish desired. I have found, however, that approximately .002 inch is a very satisfactory value to use on taps of approximately ¼ inch or larger size. This value may, however, be varied and by varying it, the depth of cut taken by the tap will be changed. Thus, those skilled in the art will have a guide by which they may determine the value to be ground off. As noted above, this amount is ground off one side of an appropriate number of teeth. In a ¼ inch tap having approximately 21 teeth (seven on each cutting face), I have found that grinding off the first 13 teeth and leaving 8 full teeth works very well.

After grinding off the first 13 teeth, .002 inch; the first 11 teeth are ground off another .002 inch. Then the first nine are ground off further .002 inch, and then seven and five, each time grinding an additional .002 inch off the same side of the teeth. This successive cutting back is illustrated in Figs. 2–4 where the full tooth outline is indicated by dot-dashed lines; the successive cuts by dashed lines and the final tooth form by full lines. It will be noted that teeth L and M each have only one cut, teeth J and K each have two, and so on to the first five teeth A–E which have been ground back five times. Each line indicating where the teeth are ground back also indicates a succeeding pair of teeth. That is, the line on tooth E adjacent to the final form of the tooth indicates the shape of the tooth F. Thus, the teeth are formed to cut away just that much metal from the workpiece. The first group of teeth (A–E) cut a small V-shaped groove. The following teeth, F and G, will cut away the material up to the last grinding line at teeth D and E. Successively, teeth H and I will be cutting to the last grinding lines on teeth F and G. Thus, all the teeth except the first group are cutting on only one side of the thread form, and chips are curled up in one direction and do not interfere as they would if cut from both edges of the V shape, and curled together jamming together at the center of the groove.

It will be noticed that this method of forming the teeth results in an unequal pitch of the thread-cutting edges. The pitch of the first few teeth (A to E in Figs. 2–4) is equal to the proper pitch of the finished threads. Similarly, the last, full teeth (from N on) are spaced by the true pitch. However, between the teeth where the number of grinding operations has been different, the crests of the cutting edges are spaced slightly closer together than the true pitch. This variation in pitch requires that the tap be fed into the work at the proper rates in order to take full advantage of my invention. This requirement may be considered to be a disadvantage. However, I have found that by use of a tap ground according to the described method, I can thread approximately ten times as many ¼ inch nuts in a machine constructed according to my aforementioned co-pending application as can prior nut threading machines, whereas, taps constructed according to prior methods were subject to an extreme amount of breakage, both of the cutting edges of the teeth and at the shank at even lower speeds. Moreover, this invention has made possible the use of such material as cemented tungsten carbide in tapping tools where, prior to my invention, such metals had always been found too brittle for such use.

The tooth form of the taps therefore may be described as a series of V-shaped teeth, at least some of the teeth having a flat portion 19 between the base thereof. The pitch of one corner or one end of the flat 19 is constant, for this corresponds to the crest of the finished thread. The pitch of the point of the teeth, however, is less than that of the corner of the flat, and therefore the flat tends to disappear toward the finishing end of the tap. The teeth toward the finishing end not only get wider at the base, but they also increase in diameter in accord with the angular form of the tooth.

In the above described example which illustrates my invention, all of the material has been ground off the tool on the leading edge of the thread cutting teeth, i. e., the edge which faces the material as the tap enters the hole. It will be apparent that the material could also be ground off the following edge, in which case the tool would cut only on the face of the teeth which faces away from the material. In this latter case, the pitch between the crests of the intermediate cutting teeth will be greater than the final desired pitch, instead of less, as in the previous example. This is, however, of little importance, since in both cases material is removed from only one side of the V-shaped thread.

After grinding the cutting teeth to their proper form, the flutes 17 may be enlarged somewhat as at 21 by grinding to allow more clearance for the cutting fluid to wash out the chips, and also to remove any burrs left by the tooth grinding operation.

While I have described my invention with particular reference to a tap having three flutes, and 21 teeth in which thirteen are ground off and have specified certain numbers of teeth to be ground a certain dimension, it is obvious that these are illustrative only and represent a preferred method only for a ¼ inch tap. As noted, the amount of material ground from each tooth determines the cut taken by succeeding teeth. This may be varied according to the finish desired on the threads or other factors as is well known in the art. The number of teeth ground off the number on the tap may also be varied particularly with reference to the size of the thread to be cut and the amount of material which must be removed to cut the thread. It will also be obvious to those skilled in the art that my tool is not limited to being a metal working tool but might also be used to cut threads in other materials as well. Thus, it is my intention to limit my invention only to the extent expressed in the following claims.

I claim:

1. A tapping tool for forming internal threads in the surface of a hole comprising a shaft having cutting teeth formed thereon, said teeth being formed in groups with the teeth in each group being substantially identical to each other and each group being an uninterrupted continuation of the preceding group, the teeth of the first group being spaced around the periphery of the tool and having the pitch of the finished thread whereby each tooth of the group follows in the identical path of the preceding tooth of the group, and at least two succeeding groups of teeth, each of said groups comprised of teeth spaced around the periphery of the tool, all of said teeth being of the same thread angle and on one side lying in the same helical path, and the width of the teeth of each succeeding group at the root and the height being greater than the teeth of the preceding group, and the final group of teeth spaced around the periphery of the tool being formed as full teeth for cutting a full thread.

2. A tapping tool for forming internal threads in the surface of a hole comprising a shaft having cutting teeth formed thereon, said teeth being formed in groups with the teeth in each group being substantially identical to each other and each group being an interrupted continuation of the preceding group, the teeth of the first group being spaced around the periphery of the tool and having the pitch of the finished thread whereby each tooth of the group follows in the identical path of the preceding tooth of the group, and at least two succeeding groups of teeth, each of said groups comprised of teeth spaced around the periphery of the tool, all of said teeth being of the same thread angle and on one side lying in the same helical path, and the width of the teeth of each succeeding group at the root and the height being greater than the teeth of the preceding group, and the final group of teeth spaced around the periphery of the tool being formed as full teeth for cutting a full thread, said teeth of said first group providing a positioning means with the cut thread to position the cutting surfaces of the teeth in the succeeding groups.

3. A tapping tool for forming internal threads in the surface of a hole comprising a fluted shaft having cutting teeth formed thereon, said teeth being formed in a plurality of groups with the teeth in each group being substantially identical to each other and each group being an uninterrupted continuation of the preceding group, the teeth of the first group being spaced around the periphery of the tool and adapted to enter the hole first and being formed to cut a groove having the pitch of the finished thread whereby each tooth of the group follows in the identical path of the preceding tooth of the group, and at least two succeeding groups of teeth, each of said groups comprised of teeth spaced around the periphery of the tool, all of said teeth being of the same thread angle and on one side lying in the same helical path, and the width of the teeth of each succeeding group at the root and the height being greater than the teeth of the preceding group, and the final group of teeth spaced around the periphery of the tool being formed as full teeth for cutting a full thread.

References Cited in the file of this patent

UNITED STATES PATENTS

| | | |
|---|---|---|
| 1,111,413 | Smith | Sept. 22, 1914 |
| 1,458,614 | Bogart | June 12, 1923 |
| 1,525,536 | Debrot | Feb. 10, 1925 |
| 1,542,893 | Kreutzberger | June 23, 1925 |
| 1,656,592 | Merrifield | Jan. 17, 1928 |
| 1,982,737 | Judge | Dec. 4, 1934 |
| 1,982,738 | Judge | Dec. 4, 1934 |
| 2,300,310 | Poeton | Oct. 27, 1942 |
| 2,307,680 | Howart | Jan. 5, 1943 |
| 2,330,099 | Whyland | Sept. 21, 1943 |
| 2,388,779 | Boehmler | Nov. 13, 1945 |

FOREIGN PATENTS

| | | |
|---|---|---|
| 253,102 | Great Britain | May 28, 1926 |